INVENTORS
Joseph W. Bracken, Jr. &
Richard M. Zeek
Paul Fitzpatrick
ATTORNEY

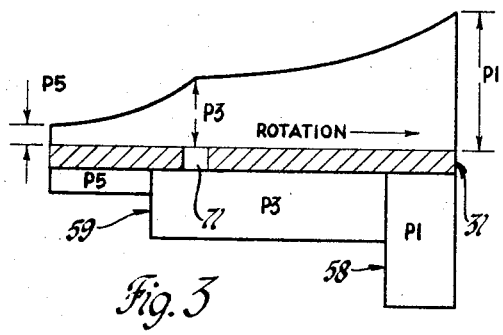
Fig. 3
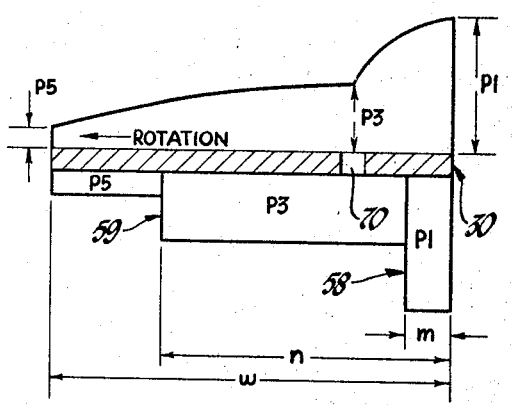
Fig. 4
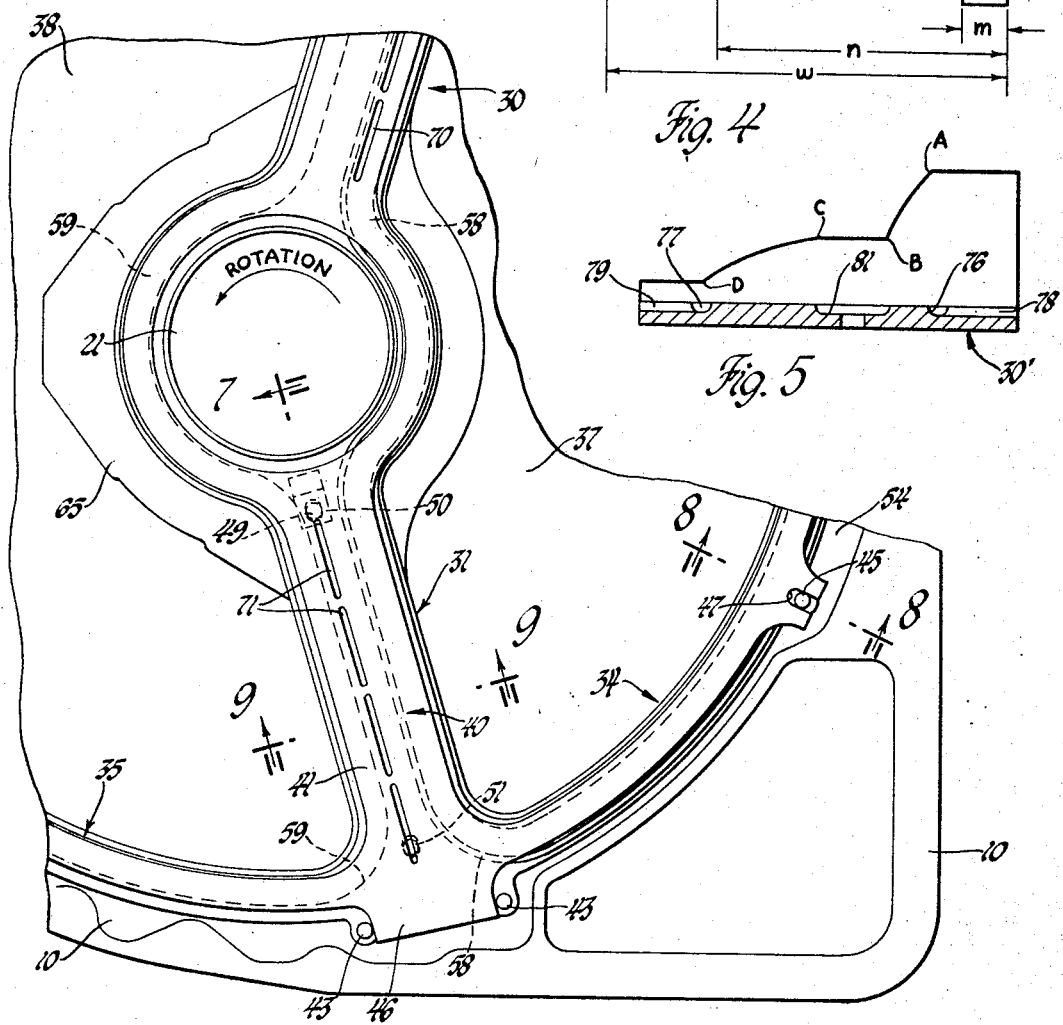
Fig. 5
Fig. 6
INVENTORS
Joseph W. Bracken, Jr. &
Richard M. Zeek
Paul Fitzpatrick
ATTORNEY

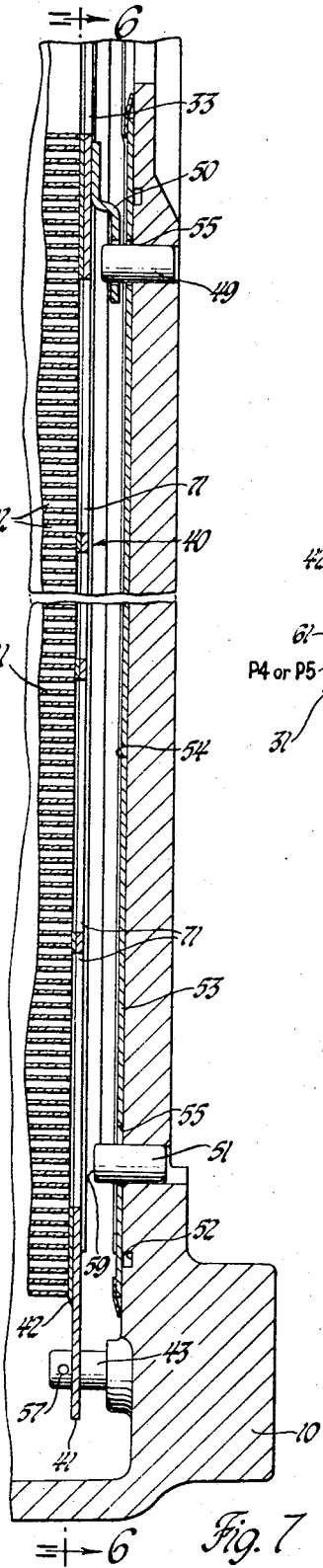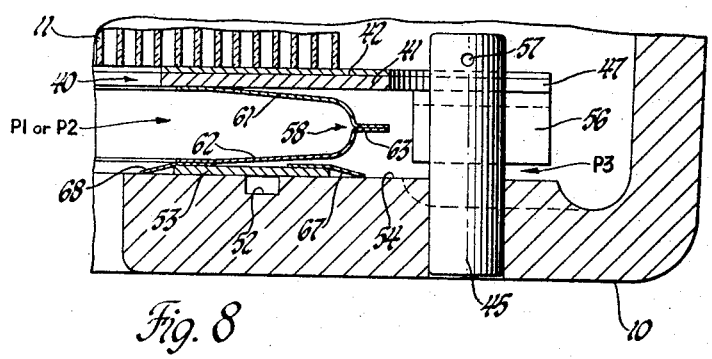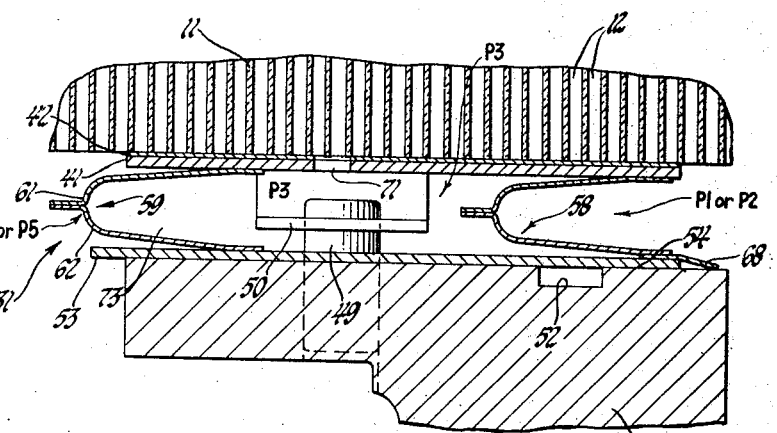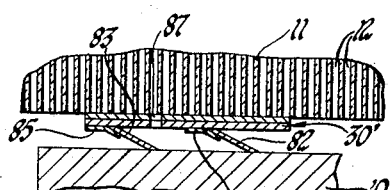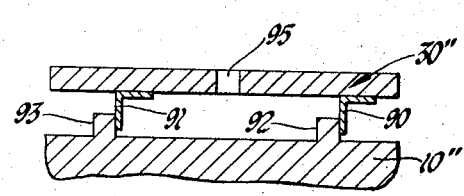

United States Patent Office 3,368,611
Patented Feb. 13, 1968

3,368,611
ROTARY REGENERATOR SEAL WITH HIGH
PRESSURE FLUID RECOVERY
Joseph W. Bracken, Jr., Redford Township, and Richard M. Zeek, Utica, Mich., assignors to General Motors Corporation, Detroit, Mich., a corporation of Delaware
Filed July 21, 1967, Ser. No. 655,174
8 Claims. (Cl. 165—7)

ABSTRACT OF THE DISCLOSURE

An axial-flow rotary regenerator having main and bypass seals embodying a common seal shoe, supported from a backing plate by yieldable walls, extending around the two gas paths. There are, thus, two yieldable walls underlying the cross-arm seals. The cross-arm seals are ported and these ports, with the passage between the yieldable walls, provide a cross-connection between the two arms of the cross-arm seal and provide an intermediate pressure which is communicated radially along the cross-arms to the outer diameter of the disk and into the central hole in the matrix. The location of the ports determines the intermediate pressure and the form of the pressure gradient curve across each seal. These factors are taken in connection with the structure and location of the yieldable walls to provide a desired balance of forces and moments on the cross-arm seal.

---

This invention relates to improvements in sealing arrangements for rotary regenerators, particularly those of the axial-flow type. Such regenerators are devices in which a finely porous metal or ceramic disk is slowly rotated so that each element of the disk passes successively through two gas paths, absorbing heat from the hotter gas and releasing it to the cooler gas.

One application of such regenerators is in preheating the combustion air in gas turbine engines. In this case, there is a large pressure difference between the compressed air which is heated and the turbine exhaust gases which give up heat. Also, particularly with metal matrices, sealing problems are aggravated by distortion of the matrix due to the large temperature gradient between the two faces.

Seals known as cross-arm seals extend across the face of the matrix disk between the high and low pressure passages to minimize leakage from high to low pressure. These seals are ordinarily in very light rubbing contact with the matrix, allowing essentially no clearance through which leakage can occur. In addition, the sort of axial-flow matrix to which this invention is preferably applied provides a large number of walls between the gas flow passages, which walls cooperate with the face of a seal shoe after the general manner of a labyrinth seal in the event the usual direct contact between seal and matrix is imperfect.

It is highly desirable in such seals to maintain a controlled light contact force between the seal and matrix to minimize leakage and at the same time minimize rubbing friction and wear of the matrix and seal shoe. It is also highly desirable that the moments of the various forces exerted on the seal shoe about an axis extending generally radially of the matrix be substantially balanced so that the seal does not ride hard at either its leading or trailing edge with respect to the direction of movement of the matrix past it.

Still another factor of consequence with respect to seals for this purpose arises from gas carry-over. As the matrix moves from one gas passage into the other, it carries gas trapped within the porous matrix structure. As the matrix moves from high to low pressure, high density gas is trapped between the matrix faces and the seals and carried into this low pressure exhaust passage. As the matrix moves from low to high pressure, a similar volume of low density exhaust gas is carried back into the high pressure passage. The result of this is a net carry-over loss of high pressure high density gas in addition to that caused by leakage of the seal. It has been known that this carry-over loss may be reduced by providing a cross-connect or flow path between suitably located intermediate points of the seals so that some of the high pressure carry-over air may be delivered into the other arm of the seal to fill the pores as the seal travels from low to high pressure. Essentially, some of the high density carry-over air is thus diverted to the other seal and carried back to the high pressure.

The desirability of controlling the forces and moments on the seal shoe has also been appreciated. However, this invention provides an improved seal in which the three desirable objects, control of bias of the seal against the matrix, control of moments of force on the seal shoe, and provision of adequate cross-connect between the two seal shoes, are satisfied. Moreover, the arrangement provides sealing in two roughly equal steps between the high and low pressure by providing seals between high pressure and an intermediate pressure and between the intermediate pressure and low pressure.

In general outline, the invention is accomplished by providing seal bars which are flexibly supported by two yieldable walls such as floating supporting strips, bellows, or diaphragms suitably located across the face of the seal circumferentially of the matrix and in which the seal shoe is ported to connect the space between the yieldable walls to the face of the matrix. The conduit defined between the yieldable walls at the rear face of the seal shoes serves to provide the cross-connect feature and also serves to exert an intermediate pressure between the high and low pressures of the two circulating media on a predetermined area of the seal shoe. By suitable choice of location of the ports, the carry-over is reduced and the level of the intermediate pressure is determined. This also influences the contour of the pressure gradient across the matrix face of the seal shoe in the circumferential direction of the matrix. The magnitude of the intermediate pressure and the location of the two yieldable walls determines both the magnitude and the moments of the gas pressure forces exerted on the rear face of the seal shoe. A structure according to this invention provides sufficient latitude in the selection of the parameters to accomplish the three objects set out above and also provides a seal support conformable to distortion of the matrix.

The principal objects of our invention are to improve the efficiency, useful life, and reliability of rotary regenerators, and to reduce the cost and complexity thereof; to provide an improved seal for a rotary regenerator; to improve pressure and moment balancing in such seals; to provide improved and simple structure to cross-connect the seal shoes of the two arms of a regenerator seal to minimize carry-over in the matrix; and to improve the performance of gas turbine engines embodying regenerators.

The nature and advantages of the invention will be clear to those skilled in the art from the succeeding detailed description of preferred embodiments and the accompanying drawings thereof.

FIGURES 3, 4, and 5 are diagrams illustrating generalized variations in pressure across the face of a seal shoe.

FIGURE 6 is a partial view of the front or matrix face of a seal and accompanying supporting structure.

FIGURE 7 is a sectional view on the plane indicated by the line 7—7 in FIGURE 6, the plane being substantially radial to the matrix axis.

FIGURE 8 is an enlarged sectional view of a rim seal taken on the plane indicated by the line 8—8 in FIGURE 6.

FIGURE 9 is an enlarged sectional view of a cross-arm seal taken on the plane indicated by line 9—9 in FIGURE 6.

FIGURE 10 is a view similar to FIGURE 9 illustrating a different embodiment of the invention.

FIGURE 11 is a view similar to FIGURE 9 illustrating a third embodiment.

Figure 1:
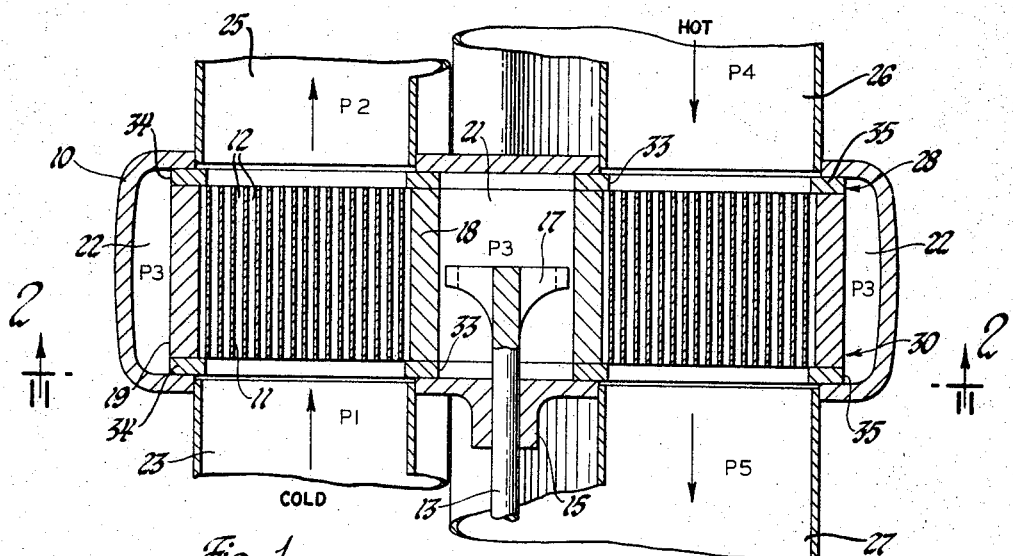
FIGURE 1 is a somewhat schematic sectional view of a regenerator taken on the plane indicated by line 1—1 in FIGURE 2.

Referring first to FIGURE 1, the regenerator comprises a housing 10 which is generally drum-shaped and which encloses an annular matrix 11 which is of a structure defining pores or passages 12 (greatly enlarged in FIGURE 1) extending from face to face of the matrix generally parallel to the axis of rotation defined by a matrix locating and driving shaft 13. Shaft 13 is mounted in suitable bearings in a boss 15 on the housing and terminates in a spider 17 which is coupled by means (not illustrated) to the matrix so that the matrix may be rotated slowly. The matrix preferably includes a non-porous inner rim 18 and an outer non-porous rim 19. It is not essential that such rims be provided, however. A generally cylindrical space 21 is defined within the interior of the matrix and a space 22 extends around the periphery of the matrix within the housing 10. An inlet 23 for cool high pressure air enters one face of the housing and opposite to it an outlet 25 is provided for the heated compressed air. The hot low pressure exhaust gases enter through an inlet 26 and leave the regenerator through an outlet 27, the two streams being thus in counterflow relation, although this is not essential to the invention. Also, the hot gas passage is of larger area than the cold air passage because of the difference in density, but this also is merely incidental to the invention.

Figure 2:
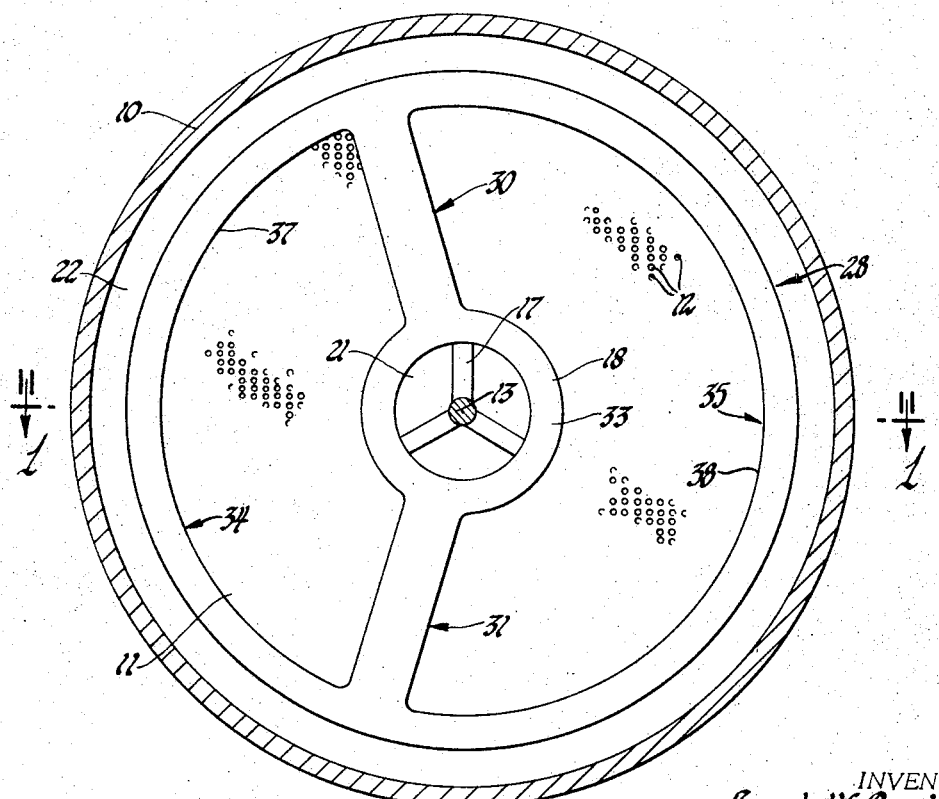
FIGURE 2 is a sectional view of the same taken in a plane indicated by the line 2—2 in FIGURE 1.

A seal or seal assembly 28 is provided between each face of the matrix and the housing to confine the cold and hot gases to the desired paths through the matrix from inlet to outlet and minimize leakage between the paths. As shown more clearly in FIGURE 2, such a seal comprises two arms 30 and 31 extending radially of the matrix face preferably joined at the inner rim of the matrix by a circular seal portion 33 extending around the interior cavity 21 and joined at the outer rim of the matrix by an arcuate rim or by-pass seal 34 extending around the high pressure path and an arcuate rim seal 35 extending around the low pressure path. The seal assembly thus defines an opening 37 for the cold high pressure air and an opening 38 for the hot low pressure exhaust gases, these openings as shown in FIGURE 2 conforming generally to the outline of the ducts 23 and 25, and 26 and 27, respectively. The structure thus far generally described may be considered as background to the present invention, which lies in aspects of the seal not shown in the conventional representation of FIGURES 1 and 2 which merely illustrate the environment of the improved seal structure.

We now refer to FIGURES 6 to 9 for the preferred structure of the main or cross-arm seals 30 and 31 and the rim or by-pass seals 34 and 35. In the preferred structure, several functionally distinct parts of the seal form a unitary assembly. The portion of the seal engaging the matrix is a unitary seal shoe 40 which comprises portions corresponding to the arms 30 and 31, the inner circle 33, and the outer circle composed of arcs 34 and 35 as indicated on FIGURE 2. The shoe 40 is a flat sheet of metal sufficiently thick to be reasonably stiff and rigid but sufficiently flexible to curve slightly in accordance with any distortion of the matrix. It comprises a seal plate 41 and a suitable wear surface 42 which covers the forward or matrix face of the shoe. The facing 42 is of any suitable material adapted to withstand the high temperatures and to minimize friction and wear due to the passage of the matrix 11 over the face of the seal shoe.

The housing 10 which encloses the matrix and provides the inlets and outlets for the two fluids mounts pins or dowels which locate the seal shoe radially and circumferentially of the matrix while giving it freedom for adjustment axially of the matrix. As shown in FIGURE 6, pins 43 are disposed on each side of tongues 46 which are an extension of each cross-arm. Pin 45 is disposed in a radial slot 47 in a tongue projecting from the outer margin of the portion 34 of the seal. Similar pins are provided at spaced points around the rim seals. Also, pins 49 located adjacent the inner ends of the cross-arms are loosely engaged in holes in sheet metal brackets 50 welded to the seal plate at the inner end of the cross-arm. Pins 49, and also pins 51 at the outer ends of the cross-arms extend through a backing plate 53 which has an outline similar to that of the seal shoe 40 and which rests against a plane inner face 54 of the housing 10. Pins 49 and 51 project through slots 55 which are elongated radially of the matrix to provide for relative expansion between the backing plate and the housing. It may be noted in FIGURE 8 that angle iron bumpers 56 project downwardly from the shoe 40 adjacent pins 45. These bumpers and the brackets 50 may engage the backing plates 53 to limit axial movement of the matrix in either direction in the event of disturbance of the matrix by shock loads or for other reasons. Lock wires (not shown) may be fitted in crossholes 57 in pins 43 and 45 to retain the seal shoe on the housing when the regenerator is being assembled or disassembled.

The principal elements of the seal structure which have not been described are the yieldable walls which connect the seal plate 41 to the backing plate 53. The term "yieldable" as used herein is intended to apply to any wall structure of a yieldable, flexible, resilient, sliding, or pivoted construction which acts as a seal between the seal plate 41 and the backing plate 53 to block flow of gas past the walls between the two plates and which permits relative displacement of the two plates over the entire area or by differential amounts at different parts of the area due to flexure of the seal plate. Thus, a bellows, a diaphragm, or a hinged wall, or other devices may be employed.

In the structure illustrated in FIGURES 6 through 9, flexible diaphragms of a channel configuration are employed. Two such diaphragms extend along the cross-arms and one diaphragm extends around each rim of the matrix. Expressed another way, a diaphragm bounds each opening 37 and 38. Referring specifically to the drawings, a continuous diaphragm 58 extends around the high pressure opening 37 and a continuous diaphragm 59 extends around the low pressure opening 38. Each of these diaphragms comprises a formed strip 61 of thin sheet metal seam-welded to the seal plate 41 and a strip 62, which is the mirror image of strip 61, seam-welded to the backing plate 53. The strips 61 and 62 have flanges 63 continuously seam-welded so that a flexible sheet metal channel structure provides a fluid-tight connection between the plates 41 and 53. The backing plate 53 rests against a flat surface 54 of the housing which extends around the axis of the matrix adjacent the rim, across the cross-arm area between the two gas paths, and around the interior space 21. A thin shim stock sealing strip 67 is seam-welded to the outer edge of the backing plate 53, extending entirely around the outer edge of both the by-pass seal portions 34 and 35. A similar shim stock sealing strip 68 is seam-welded to the inner edge of portion 35 and the high pressure side of cross-arm seal 31, this being seam-welded between the bellows strip 62 and the backing plate 53. The free edges of these strips 67 and 68 bear against the surface 54 of the housing. Groove 52 communicates with atmospheric pressure, thereby assuring that plate 53 is clamped to housing face 54 by the pressure above the plate.

It will be noted that the open side of bellows 58 is directed toward the high pressure gas opening 37. The diaphragm 59 which extends around the low pressure opening 38 is entirely similar in structure to diaphragm 58, embodying bellows strips 61 and 62 seam-welded to each other and to the seal plate 42 and backing plate 53. The diaphragm 59, which may be called the low pressure diaphragm, has its open side directed away from the low pressure gas opening 38. The bellows thus have their concave face directed toward the higher of the two pressures on opposite sides of the bellows.

It may be desirable to enlarge upon this to some extent. We may refer to the pressure of the cold air entering the matrix through inlet 23, which is the highest pressure in the system, as P1. There is a slight pressure loss due to friction as the air flows through the matrix so that the pressure P2 in the high presure outlet 25 is slightly below P1 by perhaps one or two percent. We may identify the pressure of the hot gas entering the matrix through inlet 26 as P4. In the exemplary gas turbine environment, P4 may be something like one-fourth of P1 and only slightly above atmospheric pressure. Again, there is a slight pressure drop through the matrix so that the pressure in the outlet 27, designated P5, is slightly less than P4 and usually is substantially atmospheric pressure. There is also an intermediate pressure P3 in the regenerator affecting the seals. The intermediate pressure is less than P2 and greater than P4 and is a pressure derived from ports in the face of the cross-arm seals and delivered through seal interconnecting conduits to the space 21 within the inner rim of the matrix and the space 22 extending around and outside the matrix within the housing. These pressures are indicated on FIGURE 1 and in FIGURES 8 and 9. Intermediate pressure P3 is present in the cross-arms between diaphragms 58 and 59.

Thus, the pressure differential across the rim seals 33 and 34 for the cold air path is either P1 minus P3 or P2 minus P3, these quantities being substantially the same. The pressure differential across the low pressure rim seals 33 and 35 is either P3 minus P4 or P3 minus P5, these again being essentially the same. Thus, all the rim seals are subject to the difference between high pressure and intermediate pressure or to the difference between intermediate pressure and low pressure, and none has the full pressure drop from high pressure to low pressure across it. This impoves the efficiency of sealing, but it should be pointed out that some aspects of the invention may be utilized in a device in which full pressure is exerted across the seals, as in some regenerators. To illustrate this, if the seal around the high pressure path at the inlet 23 is omitted, inlet pressure P1 will be present where P3 is present in the device illustrated. In this case, however, the pressure difference at the high pressure outlet is very small, being P1 minus P2, whereas at the hot gas side it is quite large, being P1 minus P4 or P1 minus P5. With the preferred system as illustrated, all of the rim seals are exposed to pressure drops of the same order of magnitude. They may be substantially equal but it is not essential to have P3 an average value between high and low pressures. The total drop from high to low pressure is present at the cross-arm seals, but it is divided so far as diaphragms 58 and 59 are concerned and effectively divided between two portions of the seal bars, as will be explained.

The means by which the intermediate pressure is derived involves port means through the cross-arm seal portions 30 and 31, this port means being provided in the preferred embodiment by a row of narrow slots or ports 70 and 71 providing substantially a continuous slot radially of the matrix between the inner and outer rim portions 18 and 19 of the matrix. The ports 70 are provided in the cross-arm 30 which the matrix traverses in rotating from high to low pressure and the ports 71 in the other cross-arm. The ports 70 and 71 extend through the seal shoe between the two walls 59 and 58, these yieldable walls thus bounding an equalizing conduit of substantial cross-sectional area providing for free flow of the air trapped in the matrix from ports 70 through the conduit 73 to ports 71, and also for pressurizing the spaces 21 and 22. The space 21 in effect forms a part of the equalizing conduit arrangement, since the flexible walls 58 and 59 extend around the space 21.

The structure provides a quite substantial cross-sectional area of the equalizing conduit with relation to the volume of flow due to filling of the matrix at one arm from gas which flows from the matrix to the other arm, and also for such flow as may be attendant upon leakage at the rim seals. Thus, a substantially equal pressure exists at all of the ports 70 and 71.

The structure thus far described provides a number of parameters which may be varied to provide the desired force and moment balances on the cross-arms, these being the locations across the seal of the ports 70 and 71 and the effective locations of the yieldable walls 58 and 59. The location of the ports determines the pressure contour across the sealing face of the cross-arms and the locations of the yieldable walls determines the effect both as to magnitude of force and as to moment of force of the high, intermediate, and low pressures. Viewing FIGURES 3 and 4, FIGURE 3 is a diagram of the fluid pressure exerted on the sealing face and on the rear face of a cross-arm seal bar, the lower bar 31 in FIGURE 6 at which the matrix moves from low to high pressure. FIGURE 4 is a similar diagram of pressures exerted on seal bar 30 at which rotation of the matrix is from high to low pressure. It is assumed that this seal is the one at the cold air entrance and hot gas exit face of the matrix, but there is no significant difference between the two faces. Thus, in FIGURE 4, the gas contained in the matrix exerts a pressure P1 against the seal at the leading edge which pressure decays more or less exponentially as the matrix progresses under the seal to the location of ports 70 where the pressure is intermediate pressure P3. As the matrix further rotates, the pressure further decays to P5 at the trailing edge of the seal. In the other arm (FIGURE 3), pressure rises more or less exponentially from P5 at the leading edge to P3 at ports 71 and then to P1 at the trailing edge. Note that pressure P3 is the same at both such ports. The value of P3 may be raised by moving the ports toward the high pressure edge or lowered by moving them toward the low pressure edge. This affects the pressure curves at the sealing face both through the variation in P3 and the variation in the point at which P3 is established. Obviously, both the force exerted on the seal by the pressures within the matrix and the moment of these forces about an axis in the seal are determined by the form of the pressure curve.

With the structure described, the three pressures P1, P3, and P5 are also exerted against the rear face, P1 being exerted between the high pressure edge and wall 58, P3 between walls 58 and 59, and P5 between wall 59 and the low pressure edge. Clearly, the effective location of walls 58 and 59 controls the total pressure exerted against the rear face of the seal, which is represented by the total areas of the three rectangles indicated as P1, P3, and P5 in FIGURES 3 and 4, and also determines the moments of these forces about an axis parallel to the edges of the seal.

No doubt, the application of these principles will be clear to those skilled in the art but it may be desirable to outline it briefly. Considering first the balance of forces on the seal as illustrated in FIGURE 4, we may first assume that the effective locations of the walls 58 and 59 are at distances $m$ and $n$, respectively, from the leading edge of the seal bar and that the width of the seal bar is $w$. We may consider $w$ as unity for our purposes, and thus may represent $m/w$ by $m$ and $n/w$ by $n$. Further, to simplify the statement, we may assume that P5 is atmospheric pressure and let $p$ equal the gauge value of P1, or P1 minus P5. Likewise, we may let $p'$ equal the gauge value of P3. This amounts to subtracting atmospheric pressure from all of the pressures on the diagram of FIGURE 4 so that $p$ may be substituted for P1, $p'$ for P3, and 0 for P5 in determining the forces exerted on the front and rear faces of the seal bar. With this in mind we may set up an equation for the force F exerted on the face of the matrix by the seal as follows:

$$F = pm + p'(n-m) - \overline{P}i$$

$\overline{P}i$ depends, of course, upon the pressure decay characteristics under the seal and can be determined by experiment or can be approximated by calculation. $\overline{P}i$ may be defined as $_0\int^1 Pidx$ where $Pi$ is pressure at any point against the seal bar.

Now we may also sum the moments about an axis, such as an axis at the leading edge of the seal bar as follows: Let $Mi$ be the moment of $Pi$, or $Mi = _0\int^1 xPidx$, F be the force determined above, and K be any moment due to frictional drag. K thus equals F times the coefficient of friction between matrix and seal times the moment arm, which is the distance from the matrix face to the point of exertion of the force which opposes the frictional drag. The value of K may be negligible, and may be determined by calculation or experiment. The moment summation then is $$\frac{pm^2}{2} + p'(n-m)\left[m + \frac{(n-m)}{2}\right] - Mi - \frac{F}{2} - K = 0$$

The two equations above may be solved to obtain $m$ and $n$ as follows:

$$m = \frac{-b + \sqrt{b^2 - 4ac}}{2a}$$

where $$a = \frac{p^2}{2p'} - \frac{p}{2}$$

$$b = F + \overline{P}i - \frac{p}{p'}(F + \overline{P}i)$$

and $$c = \frac{(F + \overline{P}i)^2}{2p'} - \frac{F}{2} - Mi - K$$

$$n = m + \frac{F + \overline{P}i - pm}{p'}$$

These equations make it possible to determine the location of the yieldable walls. This is the equivalent location and ordinarily will not be the actual point of contact of the wall with the seal bar, unless the seal is a simple leaf extending normal to the seal bar and having a sliding contact with the seal bar or the support plate as in FIGURE 11, to be described. For other types of support such as the diaphragm illustrated or the structure of FIGURE 10, to be described, the effective location or, in other words, the point which is assigned the value $m$ or $n$, is to be determined by analysis of the structure.

Further latitude in design may be achieved by relieving or grooving the matrix contact face of the seal so that areas are provided on the matrix side of the seal which have no effective sealing function but are exposed to the pressures within the matrix and are in sliding contact with it. This is illustrated in FIGURE 5, where a modified seal bar 30' is provided with channels 76 and 77 extending generally parallel to the leading and trailing edges, respectively, these being in direct communication with high and low pressure through channels 78 and 79 extending to the leading and trailing edges of the seal, respectively. Also, the port through which the intermediate pressure is derived may be widened as indicated at 81 so that the high pressure is exerted over the face of the seal from the leading edge to a point indicated at A in FIGURE 5, then drops to intermediate pressure at point B and remains constant to point C, from which it drops to low pressure at point D, remaining at low pressure to the trailing edge of the seal. As will be apparent, this provides a modification of the pressure curve affecting both the total force and the moment of force on the sealing face as compared, for example, to the diagram of FIGURE 4. Clearly, any of the three modifications indicated in FIGURE 5 could be used or any could be omitted. The mode of computation will be clear to those skilled in the art from the foregoing.

FIGURE 10 illustrates one modification of the structure of FIGURES 6 through 9. This may be considered as illustrating a cross-arm seal in which the seal between the seal bar 30' and the support 10 is provided by what are, in effect, hinged plates 82 and 83 which bear against abutments 84 and 85, respectively, on the seal bar 30' and are pressure biased against the support 10. In such a structure, the means for radial and circumferential location of the seal bar may be as previously described. High pressure is to the right in the figure, intermediate pressure is communicated to the space between the seals 82 and 83 by port 87 located between the abutments, and low pressure is exerted at the left in the figure. As previously stated, the effective location of the boundaries between the several pressures on the rear face of the seal bar depends upon the type of yieldable wall but it may be calculated for this form as well as for that previously described.

FIGURE 11 is an illustration of structure referred to as a sliding leaf seal above. Here the seal bar 30'' has seam-welded or brazed to it two angle strips 90 and 91 which bear slidably against ribs 92 and 93, respectively, on the support or housing 10''. The strips 90 and 91 are sufficiently flexible to be biased against the ribs to provide a sliding seal permitting movement of the seal bar 30'' in the vertical direction as illustrated. High pressure is exerted at the right, intermediate pressure is exerted between the two leaves through port 95, and low pressure is exerted at the left. Thus, the pressures hold the leaves 90 and 91 against the ribs.

The nature and advantages of the invention will be clear from the foregoing to those skilled in the art and it will be apparent that many modifications of structure may be made by the exercise of skill in the art without departing from the principles of the invention.

We claim:

1. A rotary regenerator comprising, in combination, a housing defining flow paths for two fluids at significantly different pressure levels; an axial-flow matrix mounted so that the matrix lies across the flow paths, the matrix being pervious to fluid flow in the paths and having generally radial faces for entry and exit of the fluids; means for rotating the matrix about an axis; and a cross-arm seal including two interconnected arms each extending between the said flow paths generally radially across the face of the matrix, one arm extending from a first point at the rim of the matrix to a point adjacent the axis and the other arm extending from a point at the rim angularly displaced about the axis from the first point to a point adjacent the axis, each arm extending from the housing to the matrix and defining with the matrix a seal adapted to minimize leakage from the higher pressure flow path to the lower pressure flow path;

each arm of the cross-arm seal comprising, in combination,
a seal shoe spaced from the housing having a substantially flat front face in contact with the matrix and having a rear face, the shoe extending from a high-pressure edge bounding the higher pressure flow path to a low-pressure edge bounding the lower pressure flow path,
means connecting the seal shoe to the housing locating the seal shoe radially and circumferentially of the matrix with freedom of movement axially of the matrix, and two yieldable walls extending from the housing to the rear face of the shoe generally parallel to the edges of the shoe and spanning the space between the shoe and housing, the walls being yieldable to accommodate overall and localized variation in the distance between the shoe and housing, the walls, the housing, and the rear face of the shoe defining an equalizing conduit extending substantially the length of the arm across the face of the matrix, each shoe defining port means extending through the shoe providing a substantially continuous connection between the front face of the shoe and the conduit across the face of the matrix;

means freely interconnecting the said equalizing conduits, the port means, equalizing conduits, and interconnecting means defining a cross-connect between the zones of the matrix which are momentarily in communication with the port means to conduct fluid from one arm to the other and reduce carry-over in the matrix, the equalizing conduits being thereby charged with fluid at a common intermediate pressure between the pressures in the paths;

the front face of each seal shoe being exposed to the pressure within the matrix, the rear face of each seal shoe being exposed to the higher pressure between the high-pressure edge and the first wall, to the intermediate pressure between the walls, and to the lower pressure between the second wall and the low-pressure edge, the effective locations of the ports and the walls being such as to create a desired force differential in the direction from face to face of the shoe resulting from the fluid pressures exerted on the faces of the arm and to provide a desired limitation on moments about an axis parallel to an edge of the arm resulting from the moments of the fluid pressures exerted on the faces of the seal.

2. A regenerator as recited in claim 1 in which the said interconnecting means is in the cross-arm seal.

3. A generator as recited in claim 2 in which the matrix has a central opening communicating with the said interconnecting means.

4. A regenerator as recited in claim 1 in which the regenerator has a central opening and the cross-arm seal divides so as to pass around both the higher pressure and lower pressure portions of the matrix adjacent the opening.

5. A regenerator as recited in claim 1 in which the equalizing conduits are in communication with the radially outer surface of the matrix.

6. A regenerator as recited in claim 1 in which the yieldable walls are defined by flexible diaphragms.

7. A regenerator as recited in claim 1 in which the yieldable walls are defined by hinged plate means.

8. A regenerator as recited in claim 1 in which the yieldable walls are defined by relatively sliding leaves.

References Cited
UNITED STATES PATENTS

| | | | |
|---|---|---|---|
| 2,821,367 | 1/1958 | Muller | 165—9 |
| 3,022,983 | 2/1962 | Muller | 165—9 |
| 3,204,969 | 9/1965 | Williams | 165—9 X |
| 3,262,707 | 7/1966 | Williams | 165—9 X |
| 3,301,317 | 1/1967 | Weaving et al. | 165—9 X |

ROBERT A. O'LEARY, *Primary Examiner.*

A. W. DAVIS, JR., *Assistant Examiner.*